July 12, 1949.　　　　P. GERMAIN　　　　2,476,241
RETRACTABLE RUNNER FOR LAND VEHICLES
Filed March 22, 1948
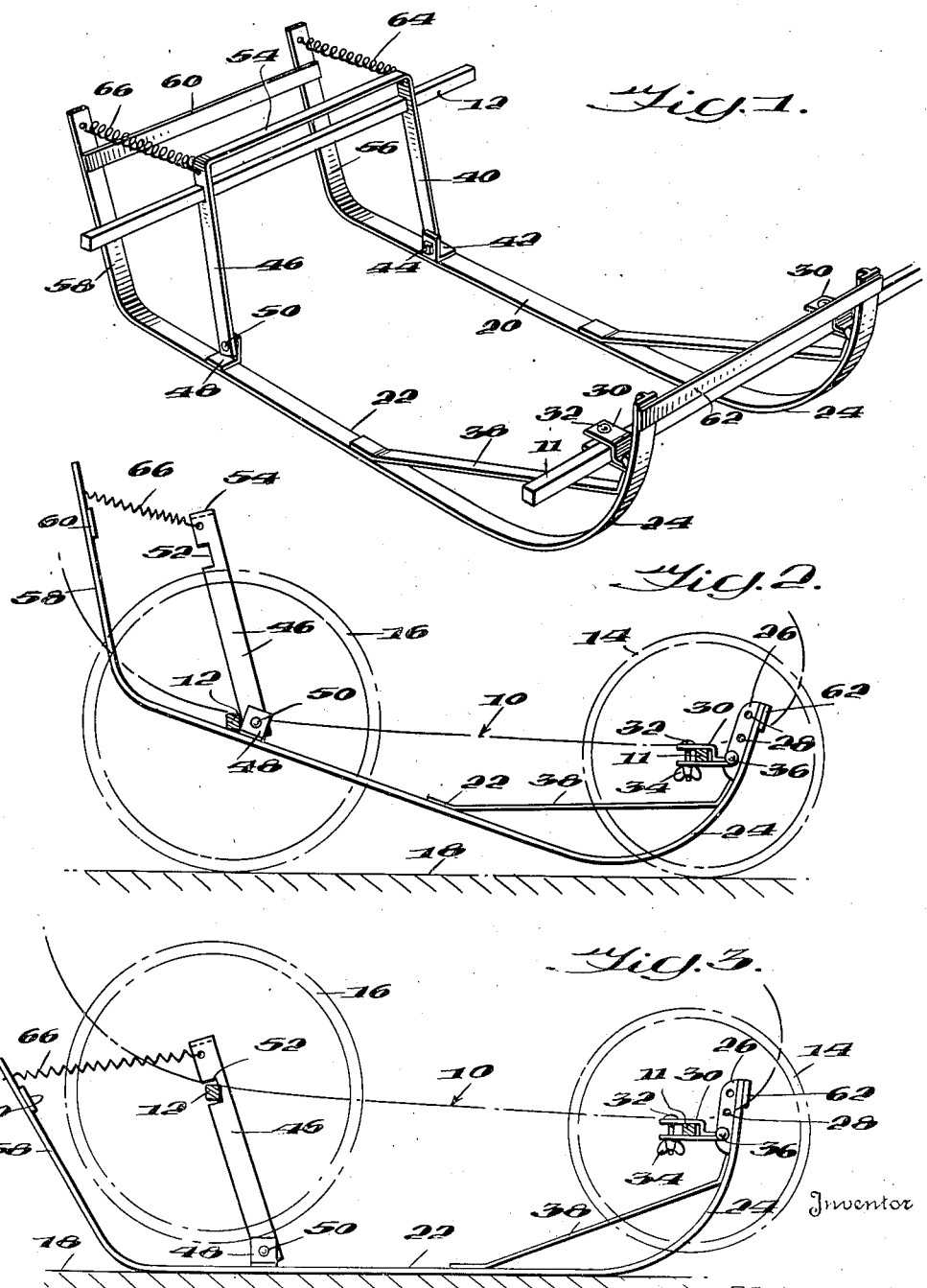

Patented July 12, 1949

2,476,241

UNITED STATES PATENT OFFICE 2,476,241

RETRACTABLE RUNNER FOR LAND VEHICLES

Paul Germain, Spencer, Mass.

Application March 22, 1948, Serial No. 16,293

5 Claims. (Cl. 280—11)

The present invention relates to a retractable sled runner assembly for a wheeled vehicle and more particularly pertains to sled runners which may be mounted on a baby carriage or the like and normally maintained in a raised position and so arranged that the sled runners may be lowered to support the vehicle for movement over snow or ice.

A conventional land vehicle which is supported for rolling movement by means of a plurality of wheels does not provide a satisfactory running gear for use on snow or ice. A conventional baby carriage or stroller provides an awkward vehicle when manually propelled over icy sidewalks or snow covered paths or the like. Accordingly, it is an object of the present invention to provide a sled runner assembly for land vehicles which are manually propelled or horse drawn and more particularly for baby carriages or strollers wherein the sled runner assembly may be lowered to such a position that the vehicle is supported on the sled runners with the wheels raised whereby the vehicle may be moved as a sled or the like including an arrangement for retracting the sled runners so that the wheels may be employed for supporting the vehicle for rolling movement.

A more specific object of the invention relates to the structural features of the sled runner assembly which may be attached to a number of vehicles or baby carriages in a simple manner and which may be moved and maintained in the lowered position by a simple movement of the foot of an attendant.

A further object of the invention is to provide a sled runner assembly for a vehicle which may be readily released for movement to a retracted position by a simple maneuver of a foot of an attendant including such an arrangement of the parts that the sled runner assembly will be maintained in the raised position without any complicated mechanical adjustment of the mechanism.

Other objects and features of the invention will be more apparent to those skilled in the art as the present disclosure proceeds and upon consideration of the following detailed description and the accompanying drawing wherein an exemplary embodiment of the invention is disclosed.

In the drawing:

Fig. 1 is a perspective view of a sled runner assembly exhibiting the invention.

Fig. 2 is a side elevational view of the sled runner assembly shown in the raised position.

Fig. 3 is a similar view showing the sled runner assembly in a lowered position.

The invention is directed to a sled runner assembly which may be permanently mounted on a land vehicle of the wheeled type and which under ordinary circumstances would be maintained in a raised position so that the vehicle may be supported for rolling movement by the wheels of the vehicle. The sled runner assembly is maintained in the raised position by means of a pair of swingable arms which are biased to positions as to partially overlie the rear axle of the vehicle by means of horizontally disposed springs. The sled runner assembly may be moved to a lowered position by the simple maneuver of depressing the assembly by movement of the foot of an attendant so that notches in the swingable arms will engage over the rear axle and latch the sled runners in a position below the periphery of the wheels and thereby support the vehicle for sliding movement on the sled runners. The invention is described herein as having particular utility in connection with a baby carriage or stroller but it will be understood that the sled runner assembly may be used on any type of wheeled vehicle such as a horse drawn carriage or the like.

Referring to the drawing, there is shown in phantom lines at 10, the chassis of a baby carriage or stroller which includes a front axle 11 and a rear axle 12. The baby carriage may be of any conventional design and includes two front wheels, one of which is shown at 14, and two rear wheels, one of which is shown at 16. These wheels normally support the vehicle for rolling movement on the ground or pavement, as indicated at 18 in Fig. 2.

In the embodiment of the invention as illustrated in the drawing, two sled runners 20 and 22 are provided which curve upwardly as indicated at 24 and terminate in substantially vertical end portions adjacent the front axle 11. The front ends of the sled runners are secured to the axle 11 preferably inside the carriage wheels 14 but nevertheless close to the ends of the axle so as to provide a relatively wide span between the sled runners.

The front end portion of each sled runner is attached to the axle in the same manner so that a description of one of these mountings will suffice to provide a clear understanding of the manner in which the sled runners are hingedly secured to the front axle 11. A plate 26 may be welded to the strap-shaped sled runner and this plate is provided with a plurality of openings or holes 28. A clamp or clevis 30 is adapted to partially embrace the front axle 11 and is maintained in fixed engagement therewith by means of a bolt 32 and a wing nut 34. The clamp or clevis 30 is provided with an eye portion through which a bolt or rivet 36 extends and this bolt or rivet may be arranged in any one of the holes 28 so as to adjust the position of the front end portion of the sled runners. This mounting of said runners on the axle permits hinged movement of the sled runners relative to the front axle 11. The arcuate shape of the front end of the sled runners may be reinforced in any suitable manner such as by means of metal bars or straps 38 welded to the horizontal portions of the sled runners and also welded at the forward end of these bars to the more vertical portions of the arcuate shaped front ends.

An arm 40 is pivotally mounted on the sled runner 20 as shown in Fig. 1 and this hinged connection may be made by means of an angle member 42 welded to the top face of the strap shaped runner 20. A bolt or rivet 44 extends through the lower end of the arm 40 and the upper leg of the angle member 42. The arm 40 is thereby free to swing about the axis of the bolt or rivet 44. A similar arm 46 is pivotally connected to the sled runner 22 by means of an angle member 48 which is welded to the sled runner 22 and by means of a bolt or rivet 50. These arms 40 and 46 extend upwardly from the respective sled runners so as to be of a length greater than the radius of the rear wheels 16. Each of the arms 40 and 46 is provided with a notch or recess 52 as more clearly shown in Fig. 2, for engaging or receiving the rear axle 12 when the sled runner assembly is in the lowered position, as shown in Fig. 3. The arms 40 and 46 may terminate a short distance above the notch 52 or the upper ends of these arms may be connected by a strap 54 as shown particularly in Fig. 1, so that the arms 40 and 46 will form the depending legs of an inverted U-shaped member with the strap 54 providing the closed end of the inverted U-shaped member. The purpose of this strap 54 will be more clearly understood as the present disclosure proceeds.

The rear end of the sled runner 20 extends upwardly as indicated at 56 and this portion of the sled runner may be of any suitable shape but preferably terminates at its upper end substantially on the level of the axle 12 when the sled runner assembly is in the lowered position. A similar upward extension 58 is provided on the rear end of the sled runner 22. These extensions of the sled runners may be connected by a cross bar 60. The front end of the sled runners may also be joined by a cross bar 62.

In carrying out the invention, a coil or helical spring 64 is connected to the upper end of the arm 40 and extends rearwardly and is connected either to the extension 56 of the sled runner or to the cross bar 60. A similar helical or coil spring 66 is connected to the upper end of the arm 46 and is securely attached at its rear end to the upper portion of the extension 58 or to the cross bar 60. These springs 64 and 66 are thereby disposed in substantially horizontal positions and normally bias the arms 40 and 46 rearwardly. Thus, with the sled runner assembly in the raised position, as shown in Fig. 2, the springs 64 and 66 swing the top ends of the arms 40 and 46 so as to partially overlie the rear axle 12 and maintain the sled runner assembly in the raised position. These springs resiliently maintain the arms 40 and 46 in firm engagement with the axle 12 and prevent any rattling when the vehicle is supported for rolling movement on the wheels 14 and 16.

When the ground is covered with snow or ice and it is desired to use the vehicle for sliding movement, the foot of the attendant may be placed on the cross bar 60 and a downward movement of this member will cause the springs 64 and 66 to be extended and a lowering movement of the sled runners 20 and 22 which are free to turn about the axis of the bolts or rivets 36. The sled runners then engage the supporting terrain 18 and further downward movement of the cross bar 60 will cause the wheels of the vehicle to be lifted above the ground or supporting surface 18. The rear axle 12 will then engage the arms 40 and 46 within the notches 52 and the springs 64 and 66 will cause these arms to be maintained in operative association with the axle 12. Accordingly, the sled runner assembly will be latched in the lowered position whereby the vehicle may be pushed or pulled for sliding movement on the sled runners.

If it is desired to use the vehicle for rolling movement on the wheels 14 and 16, the foot of the attendant may be applied first to the arm 40 or 46 at the top thereof to disengage these arms from latched engagement with the axle 12. This movement of unlatching the arms 40 and 46 may be simplified by extending the strap 54 across the upper ends of these arms. It will be understood, however, that the intermediate portion 54 of the inverted U-shaped member may be omitted. The arms 40 and 46 are biased rearwardly at their upper ends by means of the coil springs and the arms 40 and 46 are arranged at such an angle as shown in Fig. 3, that when the detent association is released, the springs 64 and 66 will nevertheless urge the sled runner assembly to the raised position by means of the angular disposition of the arms 40 and 46. The sled runner assembly will then assume the position shown in Fig. 2.

While the invention has been described with reference to specific structural details and with regard to a particular general organization, it will be appreciated that changes may be made in the elements and the combination. Such changes and others may be made without departing from the spirit and the scope of the invention as set forth in the appended claims.

What I claim and desire to secure by Letters Patent is:

1. A sled runner assembly for a land vehicle having a front and a rear axle comprising, a pair of sled runners hinged to the front axle, an arm pivotally connected to a rear portion of each sled runner, said arms each having a notch therein for engaging over the rear axle to maintain the sled runner in a lowered position, and horizontally disposed resilient means releasably retaining the notched portions of said arms in engagement with the rear axle.

2. A sled runner assembly for land vehicles having a front and a rear axle comprising, two sled runners hinged to the front axle, a substantially vertical arm hingedly connected to the rear portion of each sled runner and inclined relative to the vertical position, said arms each having a notch therein for engaging the rear axle and maintaining the sled runner in a lowered position, and horizontally disposed resilient means biasing the upper ends of said arms rearwardly for releasably retaining the notched portions of said arms in engagement with the rear axle.

3. A sled runner assembly for land vehicles having a front and a rear axle comprising, two sled runners hinged to the front axle, a substantially vertical arm hingedly connected to the rear portion of each sled runner and inclined relative to the vertical position, said arms each having a notch therein for engaging the rear axle and maintaining the sled runner in a lowered position, an extension projectig upwardly from the rear end of each sled runner, a substantially horizontally disposed coil spring connecting the upper end of one arm with the upper end of one of said extensions, and a second horizontally disposed coil spring connecting the upper end of the other arm with the upper end of the other extension.

4. A sled runner assembly for land vehicles having a front and a rear axle comprising, two sled runners hinged to the front axle, a substantially vertical arm hingedly connected to the rear portion of each sled runner and inclined relative to the vertical position, said arms each having a notch therein for engaging the rear axle and maintaining the sled runner in a lowered position, an extension projecting upwardly from the rear end of each sled runner, a substantially horizontally disposed coil spring connecting the upper end of one arm with the upper end of one of said extensions, a second horizontally disposed coil spring connecting the upper end of the other arm with the upper end of the other extension, and a cross bar connecting said extensions.

5. A sled runner assembly for land vehicles having a front and a rear axle comprising, two sled runners hinged to the front axle, a substantially vertical arm hingedly connected to the rear portion of each sled runner and inclined relative to the vertical position, said arms each having a notch therein for engaging the rear axle and maintaining the sled runner in a lowered position, an extension projecting upwardly from the rear end of each sled runner, a substantially horizontally disposed coil spring connecting the upper end of one arm with the upper end of one of said extensions, a second horizontally disposed coil spring connecting the upper end of the other arm with the upper end of the other extension, a cross bar connecting said extensions, and a cross bar connecting the front end portions of said sled runners.

PAUL GERMAIN.

No references cited.